(12) United States Patent
Lee

(10) Patent No.: US 9,701,282 B2
(45) Date of Patent: Jul. 11, 2017

(54) ENGAGEMENT DEVICE OF WIPER AND VEHICLE BODY

(71) Applicants: Hyundai Motor Company, Seoul (KR); Kia Motors Corporation, Seoul (KR)

(72) Inventor: Joon Woo Lee, Suwon-si (KR)

(73) Assignees: Hyundai Motor Company, Seoul (KR); Kia Motors Corproation, Seoul (KR)

( * ) Notice: Subject to any disclaimer, the term of this patent is extended or adjusted under 35 U.S.C. 154(b) by 0 days.

(21) Appl. No.: 14/942,058

(22) Filed: Nov. 16, 2015

(65) Prior Publication Data

US 2017/0008492 A1 Jan. 12, 2017

(30) Foreign Application Priority Data

Jul. 6, 2015 (KR) .................. 10-2015-0095658

(51) Int. Cl.
| | |
|---|---|
| *B60S 1/04* | (2006.01) |
| *B62D 25/08* | (2006.01) |
| *H02K 5/22* | (2006.01) |
| *B60S 1/08* | (2006.01) |

(52) U.S. Cl.
CPC ............ *B60S 1/0433* (2013.01); *B60S 1/0441* (2013.01); *B62D 25/081* (2013.01); *H02K 5/22* (2013.01); *H02K 5/225* (2013.01); *B60S 1/08* (2013.01)

(58) Field of Classification Search
CPC .......... B60S 1/04; B60S 1/0413; B60S 1/043; B60S 1/0433; B60S 1/0438; B60S 1/0441; B62D 25/081; B62D 25/082

USPC .............................................. 296/96.17, 192
See application file for complete search history.

(56) References Cited

U.S. PATENT DOCUMENTS

| | | | |
|---|---|---|---|
| 6,742,827 B1* | 6/2004 | Buchanan, Jr. ....... | B60S 1/0433 15/250.27 |
| 6,832,802 B2* | 12/2004 | Egner-Walter ............ | B60S 1/08 15/250.001 |
| 2007/0054534 A1* | 3/2007 | Kauffman .......... | H01R 13/6277 439/345 |

FOREIGN PATENT DOCUMENTS

| | | |
|---|---|---|
| JP | 6-24373 U | 3/1994 |
| JP | 2003-327088 A | 11/2003 |
| JP | 2005-29137 A | 2/2005 |
| JP | 2005-67421 A | 3/2005 |
| JP | 4470853 B2 | 6/2010 |
| JP | 2013-49403 A | 3/2013 |
| KR | 10-2010-0023583 A | 3/2010 |
| KR | 10-0968014 B1 | 7/2010 |
| KR | 10-1257917 B1 | 4/2013 |
| KR | 10-1339163 B1 | 12/2013 |

* cited by examiner

*Primary Examiner* — Jason S Daniels
(74) *Attorney, Agent, or Firm* — Morgan Lewis & Bockius LLP

(57) ABSTRACT

An engagement device of a wiper and a vehicle body may include a motor for driving the wiper; a motor bracket fixed to the motor; a cowl bracket fixed to the vehicle body corresponding to the motor bracket, and a mounting portion forming a fixing structure between the motor bracket and the cowl bracket, wherein the mounting portion comprises a protrusion protruded from the motor bracket or the cowl bracket, and a socket, the protrusion being inserted into and fixed to.

10 Claims, 6 Drawing Sheets

ENGAGEMENT DEVICE OF WIPER AND VEHICLE BODY

CROSS-REFERENCE TO RELATED APPLICATION

The present application claims priority to and the benefit of Korean Patent Application No. 10-2015-0095658 filed on Jul. 6, 2015, the entire contents of which is incorporated herein for all purposes by this reference.

BACKGROUND OF THE INVENTION

Field of the Invention

The present invention relates to an engagement device of a wiper and a vehicle body. More particularly, the present invention relates to an engagement device of a wiper and a vehicle body that fixes a motor of the wiper to the vehicle body and applies electric power to the motor.

Description of Related Art

A wiper apparatus of a vehicle is a safety apparatus that secures a clear view for a driver when driver's vision is bad due to weather condition such as rain and snow or dust and stain on a windshield glass. The wiper apparatus is adapted to wipe raindrop, snow, dust and stain on the windshield glass using a wiper blade.

The wiper apparatus may be mounted at a rear window, a side mirror, a headlamp as well as the windshield of the vehicle. Particularly, a predetermined parking space for receiving a wiper blade is formed under a hood and the wiper blade is positioned in the parking space and is not able to be seen from the exterior in order to secure a beautiful exterior near a cowl according to recent vehicles.

One example of such wiper apparatus is disclosed in Korean Patent Laid-Open Publication No. 2010-0023583. The wiper apparatus includes a motor, a frame and a linkage.

Generally, the wiper apparatus is made as a module and the module is fixed to the vehicle body. According to a method of fixing the wiper apparatus to the vehicle body, a mounting portion of bracket shape is formed on the frame and is fixed to the vehicle body through engagement means such as a bolt, a nut and so on.

According to a conventional mounting portion, however, electric power is hard to be applied to the wiper apparatus. Therefore, a structure for fixing the wiper module to the vehicle body and applying electric power to the wiper module simultaneously has been researched.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engagement device of a wiper and a vehicle body having advantages of fixing a motor of a wiper to a vehicle body and applying electric power to the motor simultaneously.

An engagement device of a wiper and a vehicle body according to an exemplary embodiment of the present invention may include: a motor for driving the wiper; a motor bracket fixed to the motor; a cowl bracket fixed to the vehicle body corresponding to the motor bracket; and a mounting portion forming a fixing structure between the motor bracket and the cowl bracket, wherein the mounting portion comprises a protrusion protruded from the motor bracket or the cowl bracket, and a socket, the protrusion being inserted into and fixed to.

A power connecting portion for supplying electric power to the motor may be formed at the protrusion or the socket. The power connecting portion may include: at least one terminal protruded from the protrusion or the socket; and at least one terminal insertion hole formed at the socket or the protrusion corresponding to the at least one terminal.

A plurality of terminals may be disposed apart from each other, and a plurality of terminal insertion holes may be formed corresponding to the plurality of terminals.

The protrusion may be press-fitted into and fixed to the socket.

An exterior circumferential groove may be formed on an exterior circumference of the protrusion, and an interior circumferential groove may be formed on an interior circumference of the socket corresponding to the exterior circumferential groove. The engagement device may further include a fixing ring disposed in an annular space formed by the interior circumferential groove and the exterior circumferential groove and preventing the protrusion and the socket form be disengaged from each other.

The cowl bracket may be fixed to a cowl panel defining a boundary between an engine compartment and a vehicle cabin.

The motor bracket may be fixed to a motor housing enclosing the motor.

The protrusion and the socket may be fixed to the motor bracket or the cowl bracket through fixing bolts.

The terminal and the terminal insertion hole may be made of electrically conductive material so as to be electrically connected to each other and may include an electric wire connected to the terminal or the terminal insertion hole.

The protrusion, the socket and the fixing ring may be made of metal material.

The mounting portion may include: a fixing loop fixed to the cowl bracket; a hook fixed to the motor bracket, rotatably disposed through a hinge, and hooked by the fixing loop; and a locking member rotatably disposed at the hook and prevent rotation of the hook such that the hook is disengaged from the fixing loop.

An engagement device of a wiper and a vehicle body according to another exemplary embodiment of the present invention may include: a motor for driving a wiper on a window glass; a motor bracket fixed to the motor; a cowl bracket corresponding to the motor bracket and fixed to a vehicle body; a protrusion protruded from the motor bracket or the cowl bracket; and a socket formed at the cowl bracket or the motor bracket so as to be inserted in the protrusion, wherein an exterior circumferential groove is formed on an exterior circumference of the protrusion, an interior circumferential groove corresponding to the exterior circumferential groove is formed on an interior circumference of the socket, and a fixing ring is disposed in an annular space formed by the interior circumferential groove and the exterior circumferential groove and prevents disengagement of the protrusion and the socket.

According to an exemplary embodiment of the present invention, a wiper unit is fixed to a vehicle body and electric power is applied to the wiper unit simultaneously in such a way that a protrusion is inserted into a socket.

In addition, assembling efficiency may be improved by means of simple assembling structure, assembling strength may be increased by means of insertion structure, and dispersion error of assembling may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
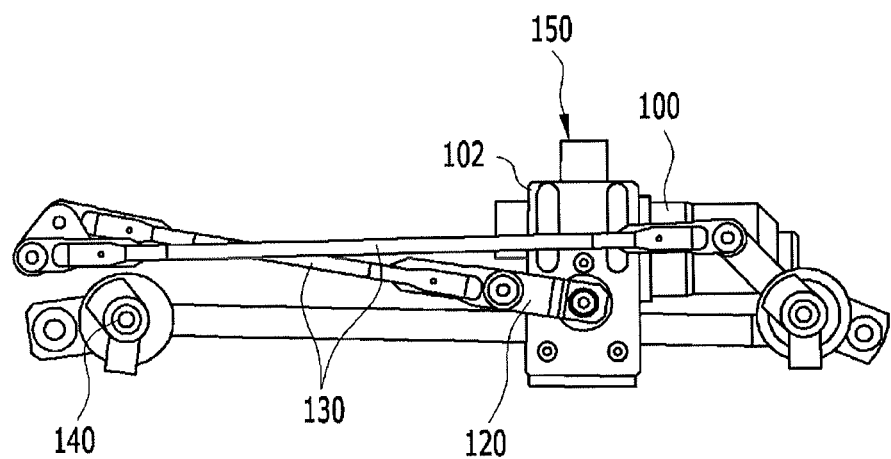
FIG. 1 is a front view of a wiper unit according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

FIG. 1 is a front view of a wiper unit according to an exemplary embodiment of the present invention.

Referring to FIG. 1, a wiper unit includes a motor 100, a mounting portion 150, a gear box 102, a rotating arm 120, a delivery link 130 and a rotating shaft 140.

The motor 100 generates torque by supplied electric power, the gear box 102 increases the torque of the motor 100 through gear ratio, and the rotating arm 120 transmits the increased torque. The motor 100 is enclosed by a motor housing.

The delivery link 130 is connected to an end portion of the rotating arm 120 and the rotating arm 120 rotates the rotating shaft 140 through the delivery link 130. In addition, an end portion of a wiper is fixed to the rotating shaft 140 and the wiper wipes a surface of a window glass and removes moisture or dust from the window glass by rotation of the rotating shaft 140.

The mounting portion 150 is fixed to and is disposed at a side of the motor 100. The mounting portion 150 is fixed to a cowl panel of a vehicle body defining a boundary between an engine compartment of a vehicle and a vehicle cabin. In addition, the mounting portion 150 may be fixed to the gear box 102 or a motor bracket 105 (see FIG. 2) fixed to the motor 100 (or the motor housing).

Since the cowl panel of the vehicle body and operation of the wiper according to the exemplary embodiments of the present invention are well known to a person of an ordinary skill in the art, detailed description thereof will be omitted.

Figure 2:
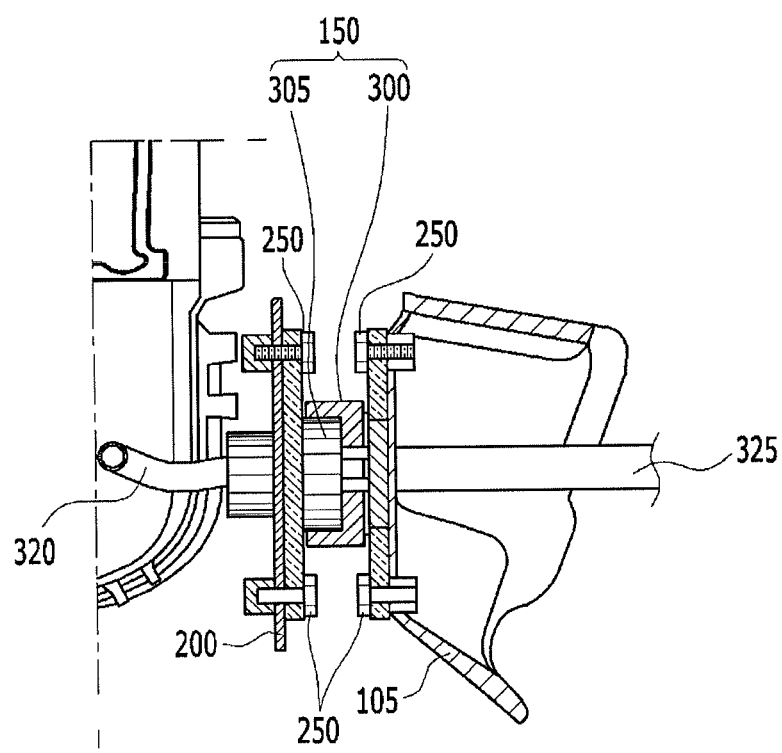
FIG. 2 is a partial cross-sectional view of an engagement device of a wiper and a vehicle body according to an exemplary embodiment of the present invention.

FIG. 2 is a partial cross-sectional view of an engagement device of a wiper and a vehicle body according to an exemplary embodiment of the present invention.

Referring to FIG. 2, an engagement device includes a first electric wire 320, a cowl bracket 200, a fixing bolt 250, a motor bracket 105, a second electric wire 325 and a mounting portion 150, and the mounting portion 150 includes a protrusion 305 and a socket 300.

The cowl bracket 200 is fixed to the cowl panel of the vehicle body and the motor bracket 105 is fixed to an exterior surface of the motor 100 corresponding to the cowl bracket 200.

The protrusion 305 is fixed to the cowl bracket 200 by the fixing bolt 250 and the socket 300 is fixed to the motor bracket 105 by the fixing bolt 250.

The protrusion 305 is press-fitted and fixed to the socket 300, and the first electric wire 320 and the second electric wire 325 supplies electric power from a battery to the motor 100 through a connection structure of the protrusion 305 and the socket 300.

Figure 3:
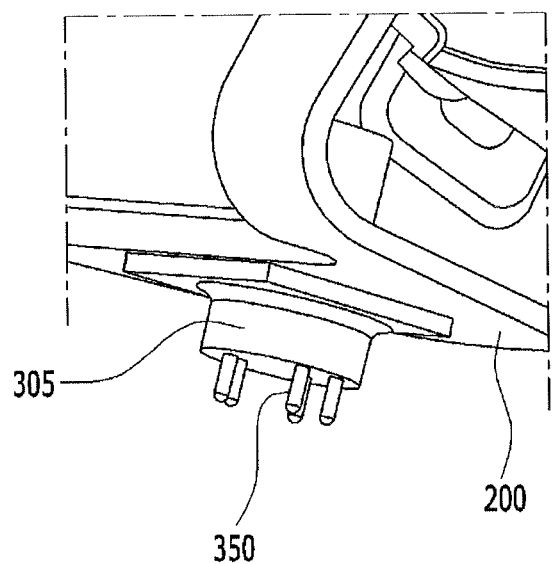
FIG. 3 is a partial perspective view of an engagement device of a wiper and a vehicle body according to an exemplary embodiment of the present invention.

FIG. 3 is a partial perspective view of an engagement device of a wiper and a vehicle body according to an exemplary embodiment of the present invention.

Referring to FIG. 3, a terminal 350 of metal material is protruded from a front surface of the protrusion 305 and is disposed to receive current from the first electric wire 320.

In addition, at least two terminals 350 may be disposed apart from each other on the front surface of the protrusion 305.

Figure 4:
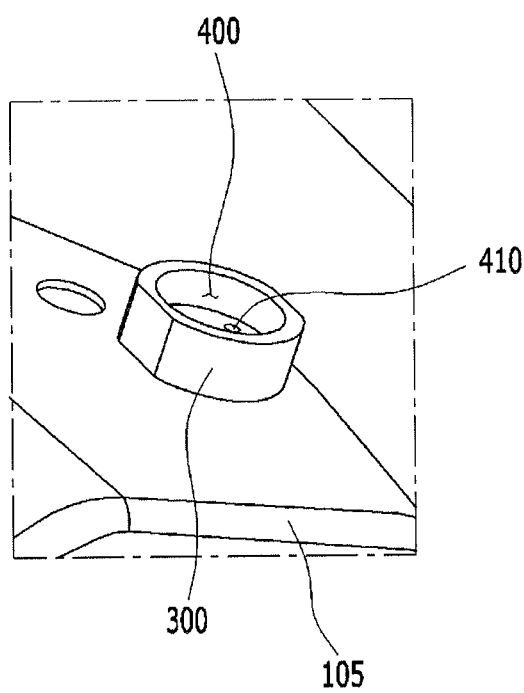
FIG. 4 is a partial perspective view of an engagement device of a wiper and a vehicle body according to an exemplary embodiment of the present invention.

FIG. 4 is a partial perspective view of an engagement device of a wiper and a vehicle body according to an exemplary embodiment of the present invention.

Referring to FIG. 4, a protrusion recess 400 is formed at the socket 300 and a terminal insertion hole 410 into which the terminal 350 is inserted is formed on an interior surface of the protrusion recess 400. The terminal insertion hole 410 is disposed to supply current to the second electric wire 325.

In addition, at least two terminal insertion holes 410 corresponding to the terminals 350 may be disposed apart from each other.

Figure 5:
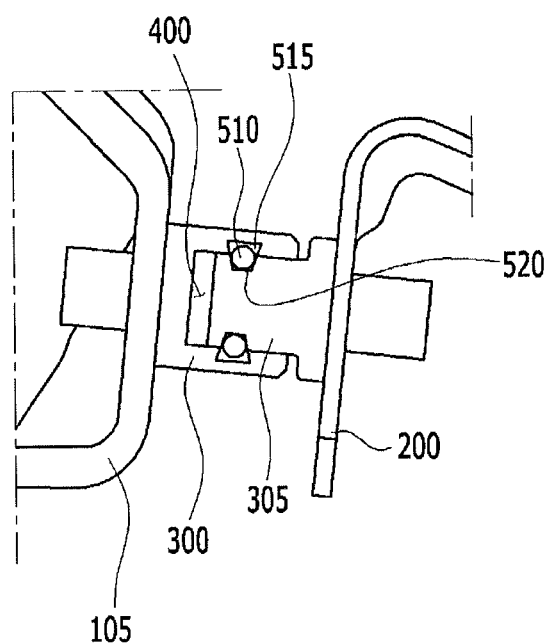
FIG. 5 is a partial cross-sectional view of an engagement device of a wiper and a vehicle body according to an exemplary embodiment of the present invention.

FIG. 5 is a partial cross-sectional view of an engagement device of a wiper and a vehicle body according to an exemplary embodiment of the present invention.

Referring to FIG. 5, a rear end portion of the protrusion 305 is inserted into and fixed to the cowl bracket 200, and a rear end portion of the socket 300 is inserted into and fixed to the motor bracket 105.

In addition, the protrusion recess 400 is formed at the socket 300 corresponding to the protrusion 305, and the protrusion 305 is inserted into the protrusion recess 400 so as to be fixed thereto.

An exterior circumferential groove 520 is formed at an exterior circumference of the protrusion 305, and an interior circumferential groove 515 corresponding to the exterior circumferential groove 520 is formed at an interior circumference of the socket 300.

The interior circumferential groove 515 and the exterior circumferential groove 520 form an annular space, and a fixing ring 510 is disposed in the interior circumferential groove 515 and the exterior circumferential groove 520.

The fixing ring 510 is disposed simultaneously in the interior circumferential groove 515 and the exterior circumferential groove 520 and prevents disengagement of the protrusion from the socket 300.

In the exemplary embodiment of the present invention, the socket 300, the protrusion 305 and the fixing ring 510 may be made of metal material, and the protrusion 305 is press-fitted and fixed to the socket 300.

Figure 6:
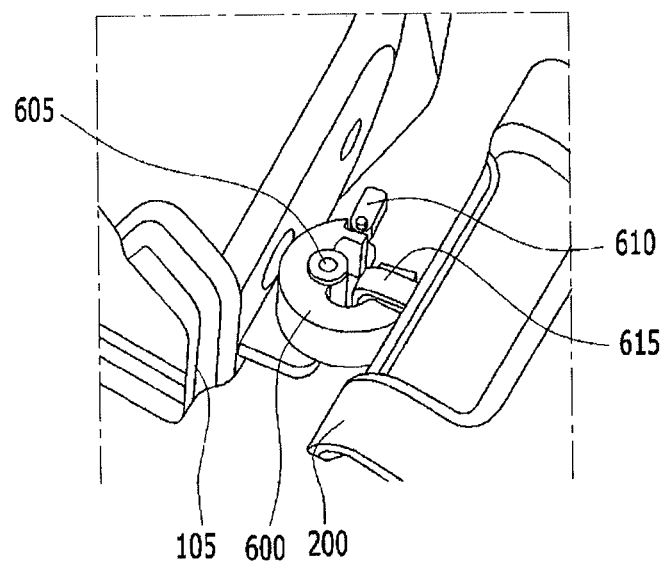
FIG. 6 is a partial perspective view illustrating an engagement device related to an exemplary embodiment of the present invention.

FIG. 6 is a partial perspective view illustrating an engagement device related to an exemplary embodiment of the present invention.

Referring to FIG. 6, a hook 600, a fixing loop 615 and a locking member 610 are disposed between the motor bracket 105 and the cowl bracket 200.

The fixing loop 615 is fixed to the cowl bracket 200 and the hook 600 is rotatably disposed at the motor bracket 105 through a hinge 605.

If the hook 600 rotates about the hinge 605, the hook 600 is hooked to the fixing loop 615 so as to be fixed thereto.

In addition, the locking member 610 is rotatably disposed at the hook 600. In a state that the hook 600 is fixed to the fixing loop 615, the locking member 610 is locked up so as to prevent disengagement of the hook 600 from the fixing loop 615.

Operation of the hook 600, the fixing loop 615 and the locking member 610 shown in FIG. 6 is well known to a person of an ordinary skill in the art, detailed description thereof will be omitted.

It is exemplified in FIG. 1 that one mounting portion 150 is disposed at the motor bracket 105 fixed to the motor 100, but additional mounting portions 150 may be disposed at the motor bracket 105.

In addition, it is exemplified in FIG. 2 that the protrusion 305 is fixed to the cowl bracket 200 and the socket 300 is fixed to the motor bracket 105, but the protrusion 305 may be fixed to the motor bracket 105 and the socket 300 may be fixed to the cowl bracket 200.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engagement device of a wiper and a vehicle body, comprising:
   a motor for driving the wiper;
   a motor bracket fixed to the motor;
   a cowl bracket fixed to the vehicle body corresponding to the motor bracket; and
   a mounting portion forming a fixing structure between the motor bracket and the cowl bracket,
   wherein the mounting portion comprises a protrusion protruded from the motor bracket or the cowl bracket, and
   a socket, the protrusion being inserted into and fixed to the socket,
   wherein the mounting portion comprises:
      a fixing loop fixed to the cowl bracket;
      a hook fixed to the motor bracket, rotatably disposed through a hinge, and hooked by the fixing loop; and
      a locking member rotatably disposed at the hook and preventing rotation of the hook such that the hook is disengaged from the fixing loop.

2. The engagement device of claim 1,
   wherein a power connecting portion for supplying an electric power to the motor is formed at the protrusion or the socket, and
   wherein the power connecting portion comprises:
      at least one terminal protruded from the protrusion or the socket; and
      at least one terminal insertion hole formed at the socket or the protrusion corresponding to the at least one terminal.

3. The engagement device of claim 2, wherein a plurality of terminals are disposed apart from each other, and a plurality of terminal insertion holes are formed corresponding to the plurality of terminals.

4. The engagement device of claim 2, wherein the at least one terminal and the at least one terminal insertion hole are made of electrically conductive material to be electrically connected to each other and include an electric wire connected to the at least one terminal or the at least one terminal insertion hole.

5. The engagement device of claim 1, wherein the protrusion is press-fitted into and fixed to the socket.

6. The engagement device of claim 1,
   wherein an exterior circumferential groove is formed on an exterior circumference of the protrusion, and an interior circumferential groove is formed on an interior circumference of the socket corresponding to the exterior circumferential groove, and
   wherein the engagement device further comprises a fixing ring disposed in an annular space formed by the interior circumferential groove and the exterior circumferential groove and preventing the protrusion and the socket form be disengaged from each other.

7. The engagement device of claim 6, wherein the protrusion, the socket and the fixing ring are made of metal material.

8. The engagement device of claim 1, wherein the cowl bracket is fixed to a cowl panel defining a boundary between an engine compartment and a vehicle cabin.

9. The engagement device of claim 1, wherein the motor bracket is fixed to a motor housing enclosing the motor.

10. The engagement device of claim 1, wherein the protrusion and the socket are fixed to the motor bracket or the cowl bracket through fixing bolts.

* * * * *